Figure 1:
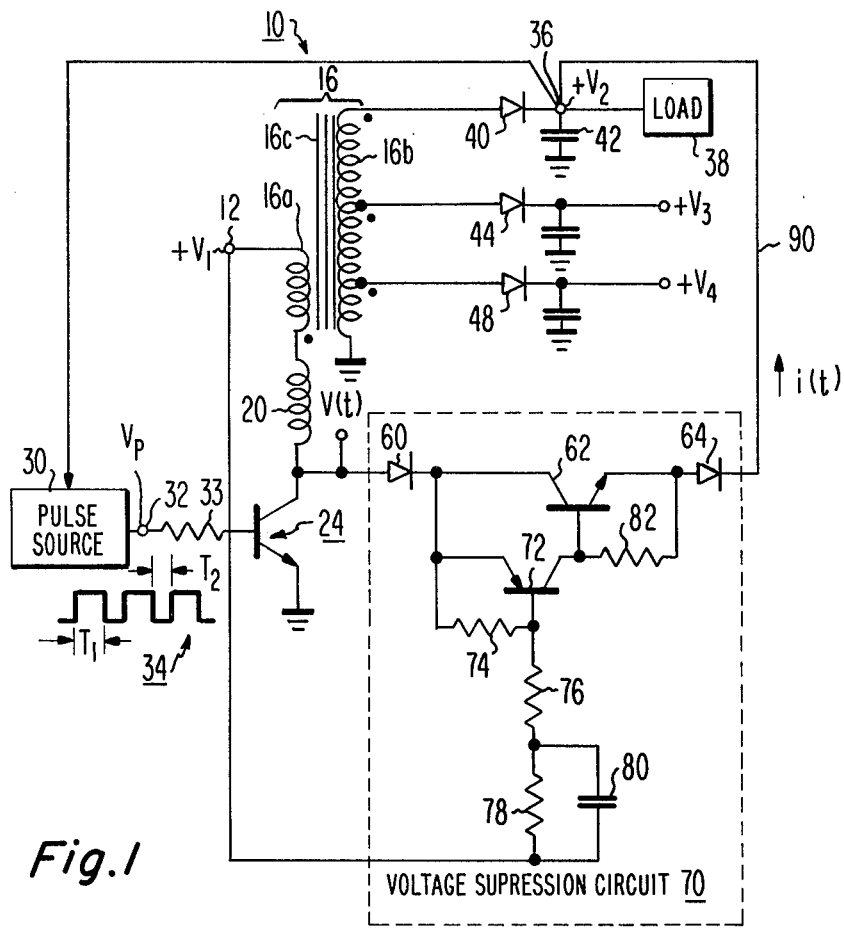

United States Patent [19]

Clark, Jr. et al.

[11] 4,323,957

[45] Apr. 6, 1982

[54] VOLTAGE SUPRESSION CIRCUIT FOR A VOLTAGE CONVERTER CIRCUIT

[75] Inventors: Charles A. Clark, Jr., Chatsworth; Finis C. Easter, Canoga Park, both of Calif.

[73] Assignee: Sperry Corporation, New York, N.Y.

[21] Appl. No.: 150,284

[22] Filed: May 16, 1980

[51] Int. Cl.³ .................. H02M 3/335; H02H 7/122
[52] U.S. Cl. ........................................ 363/21; 363/56
[58] Field of Search .................................. 363/18–21, 363/55–56, 95, 97, 131–134; 307/542, 544, 546, 547, 549

[56] References Cited

U.S. PATENT DOCUMENTS

| | | | |
|---|---|---|---|
| 3,697,852 | 10/1972 | Gerbitz | 363/21 |
| 4,016,482 | 4/1977 | Cielo et al. | 363/56 |
| 4,027,177 | 5/1977 | Davis | 307/544 |
| 4,031,453 | 6/1977 | Teuling | 363/20 |

*Primary Examiner*—William M. Shoop
*Assistant Examiner*—Peter S. Wong
*Attorney, Agent, or Firm*—Howard P. Terry

[57] ABSTRACT

A voltage conversion circuit includes a transformer having a primary winding and a secondary winding with an output terminal. The primary winding is coupled in series with a switching circuit across a source of DC potential. The switching circuit periodically interrupts the DC potential to the primary winding and upon the interruption the primary winding undesirably produces a switching circuit damaging voltage spike. A voltage suppression circuit is responsive to the voltage polarity reversal in the transformer primary, which occurs when the input voltage is interrupted thereto for transferring the energy, which would otherwise produce the voltage spike, to the converter output terminal to add energy thereto. When the switching circuit is non-operational no voltage reversals are present in the transformer and no voltage is therefore passed to the output terminal.

9 Claims, 2 Drawing Figures

VOLTAGE SUPRESSION CIRCUIT FOR A VOLTAGE CONVERTER CIRCUIT

This invention relates to a voltage converter circuit involving a DC input voltage and a transformer and more particularly to the elimination of voltage spikes therein.

In a DC-to-DC converter of the single ended or flyback type used in a power supply, a switching means such as a switching transistor is switched "on" to charge the primary winding of the transformer. When the switching transistor is switched "off", the stored energy in the primary winding causes the primary winding to reverse polarity and "flyback" to the voltage which provides the desired voltage to the transformer secondary winding or windings. A real transformer undesirably has finite leakage reactance due to imperfect coupling of the primary and secondary windings. Because of the leakage reactance a very high voltage spike appears at the junction of the transformer primary and switching transistor which is normally coupled to the transformer secondary load to provide energy thereto. If not reduced, the voltage spike will typically destroy the switching transistor. It is common to use a power dissipative clamp such as a Zener diode or resistor-capacitor network across the transformer primary to protect the transistor, but such an arrangement wastes power. It is also known to connect the spike energy to a transformer secondary output terminal by means of a diode, for example. But if the primary voltage is supplied to the transformer all the time and the converter is "shut-off" only by not periodically switching "on" the transistor switch, when the converter is "shut-off" the primary voltage is thus applied through the diode to the secondary output, an unacceptable situation.

In accordance with a preferred embodiment of the invention, a voltage converter includes a transformer having a primary winding and a secondary winding with an output terminal and switch means for periodically alternately connecting and disconnecting input power to the primary winding wherein the transformer primary produces a signal polarity reversal and produces energy when power is removed therefrom which is not coupled through the transformer to its secondary. A means produces a control signal when the polarity reversal occurs. A means is responsive to the control signal for passing the energy produced in the transformer primary when power is removed therefrom to the output terminal.

Figure 2:
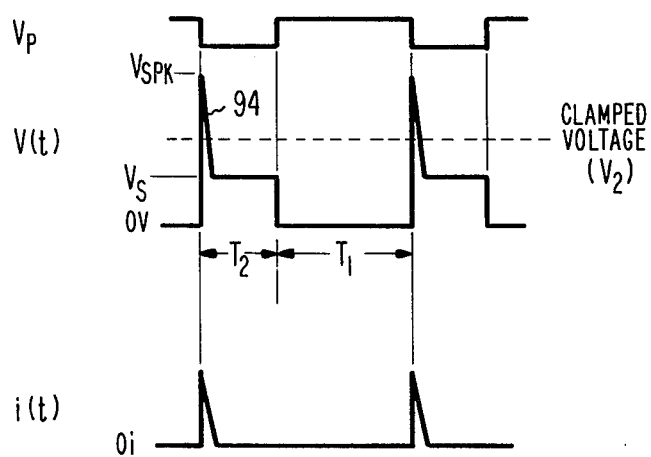

In the drawing:

FIG. 1 is a schematic diagram of a DC-to-DC converter circuit employing a voltage suppression circuit in accordance with a preferred embodiment of the instant invention; and FIG. 2 is a set of waveforms useful in understanding the operation of the circuit of FIG. 1.

Referring now to FIG. 1, a source of direct current (DC) voltage is applied between terminal 12 and circuit ground of a DC-to-DC converter 10. Terminal 12, at voltage value $+V_1$ relative to ground, is coupled to the primary winding 16a of a flyback type transformer 16. Primary winding 16a is illustrated as coupled to a leakage reactance 20 which, in reality, is not a lumped element as illustrated but is rather a distributed inductance. It will be understood that the inductance 20 is not coupled to the transformer core 16c or secondary winding 16b. Inductance 20 is series connected to the collector of an NPN switching transistor 24, the emitter of which is connected to ground. A pulse source 30 of voltage $V_P$ is connected at terminal 32 via current limiting resistor 33 to the base of transistor 24 and produces a series of pulses as indicated at waveform 34.

The secondary winding 16b of transformer 16 typically includes several taps coupled to associated rectifying circuits to produce various DC voltages some of which may be above $V_1$ in value and some of which may be below $V_1$ in value. In FIG. 1, three such taps are shown producing, $+V_2$, $+V_3$, and $+V_4$, volts respectively via diodes 40, 44, and 48 relative to ground to which one end of transformer secondary winding 16b is connected. In FIG. 1 voltage $+V_2$ produced at terminal 36 provides power to a load 38. In FIG. 1, each of the rectifying circuits comprises a single diode such as diode 40 and an appropriate energy storage capacitor such as capacitor 42 connected between the diode 40 at the terminal 36 and ground. Also, any one of the ouput DC voltages such as $+V_2$ is typically fed back to pulse source 30 to provide feedback signals thereto to thereby control the "on" and "off" periods $T_1$ and $T_2$, respectively of signals produced at terminal 32 by pulse source 30 and thereby control the output voltages in known conventional fashion.

The collector of transistor 24 is at one end of a series connection which includes in order a diode 60, an NPN transistor 62, and a second diode 64 of a voltage suppression circuit 70. The cathode of diode 64 is coupled to terminal 36 via lead 90 to pass current i(t) thereto. The cathode of diode 60 is coupled to the emitter of a PNP transistor 72 and to an emitter-base resistor 74 of transistor 72. The base of transistor 72 is series coupled through a resistor 76 and the parallel combination of a resistor 78 and a capacitor 80 to terminal 12. A resistor 82 is coupled between the base and the emitter of transistor 62.

Operation of the circuit of FIG. 1 will be described with reference as desired to the waveforms of FIG. 2 and with the initial assumption that diode 60 is removed thereby effectively disconnecting circuit 70. It will be assumed that pulse source 30 is producing alternating relatively positive and relatively negative pulses at terminal 32 of respective time durations $T_1$ and $T_2$ and with a ratio $(T_1/T_2)$ which is determined by the feedback from terminal $+V_2$ in a well known manner. When the base of transistor 24 is sufficiently positive relative to its emitter the transistor is switched "on" in a conducting state and therefore the collector thereof is essentially at ground. When the pulse source 32 is producing a sufficiently low voltage, transistor 24 is switched off and the winding 16a is open circuited except for path through switch clamp 70 which will be ignored since diode 60 is removed.

When transistor 24 is turned "on" voltage applied at terminal 12 is essentially impressed across winding 16a thereby charging the transformer primary inductance. When thereafter transistor 24 is turned "off", the stored energy in the primary 16a at the time that the transistor is turned "off" reverses the polarity of the voltage across the primary 16a and thus raises the voltage on the collector of transistor 24 up in value until it reaches the level required for conduction of the rectifier diodes 40, 44, and 48, respectively. As is known to those skilled in the art, the voltage of the collector of transistor 24 will flyback to a sustaining voltage level $V_S = V_1 (1 + T_1/T_2)$. In addition, because of the presence of the leakage reactance 20 a very high voltage spike 94 (FIG. 2, waveform V(t)) occurs at the collector of transistor 24 upon the turnoff of the transistor of a value determined by resonance of the leakage reactance of inductor 20 and stray circuit capacitance (not shown). This is a voltage which is not coupled to the secondary of the transformer. In the absence of some sort of clamp between the collector of transistor 24 and ground, the voltage spike may be so great as to destroy the transistor, depending on the breakdown voltage of the transistor.

Voltage suppression circuit 70 prevents spike 94 and operates as follows with diode 60 connected. When transistor 24 turns "off", the voltage at the end of the transformer connected thereto rapidly rises from essentially ground as illustrated in FIG. 2, waveform V(t). When the voltage rises approximately two volts (two diode drops) above the DC input level $+V_1$ at terminal 12, current flows through diode 60, from the emitter to the base of transistor 72, through resistor 76 and through resistor 78 to terminal 12, causing transistor 72 to be conductive in saturation. Due to transistor 72 being conductive a control signal is produced at the collector thereof which causes transistor 62 to become conductive providing a current path from the collector of transistor 24, through diode 60, through the collector and emitter of transistor 62 and through diode 64 to terminal 36 at voltage $+V_2$. Voltage $+V_2$ is chosen such that it is above the normal voltage of the collector of transistor 24 when the transistor is "off" and well below the voltage $V_{spk}$ which may damage the transistor 24. That is $+V_2$ must be greater than $V_S$ and less than the voltage which would damage transistor 24. When voltage V(t) rises slightly above voltage $V_2$, and thus diodes 60 and 64 are conductive, the collector of transistor 24 is clamped to just slightly above voltage $+V_2$. Further the current indicated in FIG. 2, waveform i(t) flows into terminal 36 adding power thereto which would otherwise be wasted. After the energy, which would otherwise go into voltage spike 94, is transferred to terminal 36, a sustaining voltage $V_S$ (FIG. 2, waveform V(t)) is maintained by winding 16a on the collector of transistor 24 until terminal 32 goes relatively positive and the cycle repeats.

As an alternative, if a suitable voltage is not otherwise present the cathode of diode 64 may be coupled to a tap (not shown) on the secondary of transformer 16 at a point which is above the voltage at the collector of transistor 24 when the transistor is "off" during cycle portions $T_2$ (waveform 34, FIG. 1), and below a transistor damaging voltage. The circuit otherwise works as described above.

It will be noted that, when the circuit of FIG. 1 is actually inoperative such as when pulse source 30 is producing no pulses to turn "on" transistor 24, the collector of transistor 24 rises to a level no greater than $+V_1$ and therefore circuit 70 does not become operational and no signal path is therefore created between terminals 32 and 36.

What is claimed is:

1. In a voltage conversion circuit which includes a transformer with a primary winding receptive of input DC voltage and a secondary winding and which includes a first switching means coupled in series with the primary winding for alternately applying and removing the input DC voltage to and from the primary winding, and wherein the removing of the input DC voltage from the primary winding normally produces an undesirable transient signal through the first switching means, the improvement which comprises:

first diode coupled to said first switching means and poled to conduct said transient signal, in the forward bias mode, away from said first switching means, potential means for clamping said transient signal to a predetermined level, second switching means having conductive and non-conductive states coupled to said first diode and coupled to said potential means for coupling, when conductive, said transient signal to said potential means, and bias means coupled to said second switching means for maintaining said second switching means in said non-conductive state when said input DC voltage is applied to said primary winding and for maintaining said second switching means in said conductive state after said input DC voltage is removed from said primary winding.

2. The improvement according to claim 1 wherein said potential means comprises rectifying means coupled to said secondary winding and first energy storage means coupled to said rectifying means.

3. The improvement according to claim 1 wherein said improvement further comprises second diode means for coupling said second switching means with said potential means.

4. The improvement according to claim 3 wherein said second diode means is poled to conduct said transient signal, in the forward bias mode, away from said second switching means.

5. The improvement according to claim 1 wherein said second switching means comprises a first transistor, the emitter of which is coupled to said first diode and a second transistor, the collector of which is coupled to said first diode, the emitter of which is coupled to said potential means, and the base of which is coupled to the collector of said first transistor.

6. The improvement according to claim 5 wherein said bias means comprises first impedance means receptive of said input DC voltage and coupled to the base of said first transistor and comprises second impedance means coupled to said first diode and to the base of said first transistor.

7. The improvement according to claim 6 wherein said first impedance means comprises first and second resistive means coupled in series and second energy storage means coupled in parallel with said first resistive means.

8. The improvement according to claim 5 wherein said bias means comprises third impedance means coupled between the base and emitter of said second transistor.

9. The improvement according to claim 1 wherein said bias means is receptive of said input DC voltage and so constructed and arranged to impel said second switching means into said conductive state when said transient signal exceeds said first DC voltage.

* * * * *